United States Patent [19]

Yamamoto et al.

[11] Patent Number: 5,355,419
[45] Date of Patent: Oct. 11, 1994

[54] ON-VEHICLE AUDIO SYSTEM REPRODUCING BODILY-SENSIBLE SOUNDS

[75] Inventors: Hideo Yamamoto; Shiro Kato; Yuji Fukata; Yoichi Satoh; Akihiro Suzuki, all of Kawagoe; Kenji Suehiro; Shigeru Takenaka, both of Hiroshima, all of Japan

[73] Assignee: Pioneer Electronic Corporation, Tokyo, Japan

[21] Appl. No.: 52,480

[22] Filed: Apr. 23, 1993

[30] Foreign Application Priority Data

Apr. 28, 1992 [JP] Japan ................... 4-110142

[51] Int. Cl.$^5$ ............................................. H04B 1/00
[52] U.S. Cl. ...................................... 381/86; 381/57; 381/107
[58] Field of Search .................. 381/57, 86, 107, 108, 381/71

[56] References Cited

U.S. PATENT DOCUMENTS

| 4,641,344 | 2/1987 | Kasai et al. | 381/57 |
| 4,864,246 | 9/1989 | Kato et al. | 381/107 |
| 5,034,984 | 7/1991 | Bose | 381/86 |
| 5,035,235 | 7/1991 | Chesky | 128/33 |
| 5,245,664 | 9/1993 | Kinoshite et al. | 381/71 |

*Primary Examiner*—Forester W. Isen
*Attorney, Agent, or Firm*—Perman & Green

[57] ABSTRACT

An on-vehicle audio system reproducing bodily-sensible sounds is devised to rapidly eliminate masking of bodily-acoustic audio sounds caused by vibrations of a running vehicle and generate bodily-sensible sounds without giving an inharmonious feeling to the listener. The system has a low pass filter for extracting only low frequency band components of an input signal, an amplifier for amplifying the output of the low pass filter and delivering the amplified signal, a vibration unit disposed in a seat of the vehicle for converting the amplified signal to mechanical vibrations. To eliminate the masking, the system is provided with a vibration sensor for generating a vibration signal of a magnitude in accordance with vibrations of the vehicle, and a level adjusting unit for adjusting the level of the input signal in accordance with an average level of the vibration signal.

6 Claims, 6 Drawing Sheets

ON-VEHICLE AUDIO SYSTEM REPRODUCING BODILY-SENSIBLE SOUNDS

BACKGROUND OF THE INVENTION

1. Field of the Invention

The present invention relates to an audio system reproducing sound energy to cause bodily sensation, and more particularly to an on-vehicle audio system reproducing bodily sensible sounds.

2. Description of Background Information

Audio systems reproducing bodily-sensible sounds are devised to convert low frequency band component signals extracted from audio signals to mechanical vibrations to have a listener directly and bodily sense the vibrations, in addition to producing acoustic effects by an acoustic transducer such as a speaker which transmits music sounds through air propagation, thereby reproducing realistic sounds.

Figure 1:
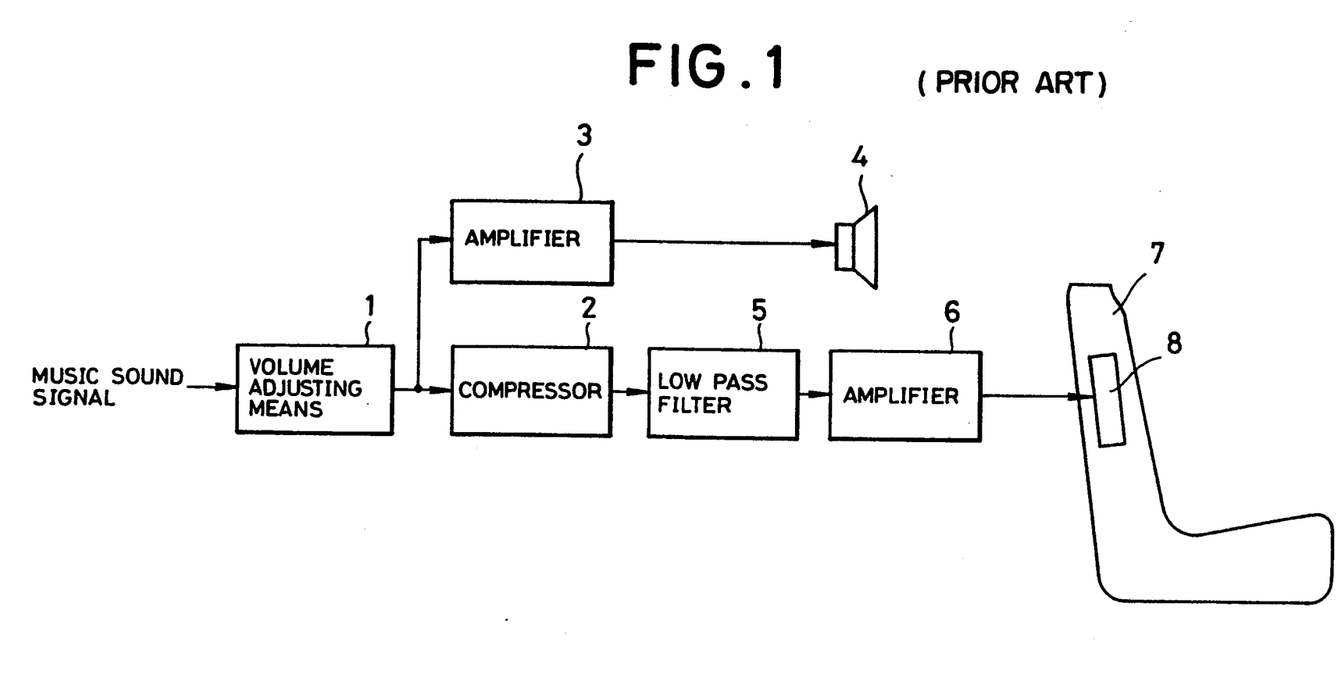
FIG. 1 is a block diagram showing the configuration of a conventional audio system reproducing bodily-sensible sounds.

FIG. 1 illustrates the configuration of a conventional on-vehicle audio system reproducing bodily-sensible sounds.

Figure 2:
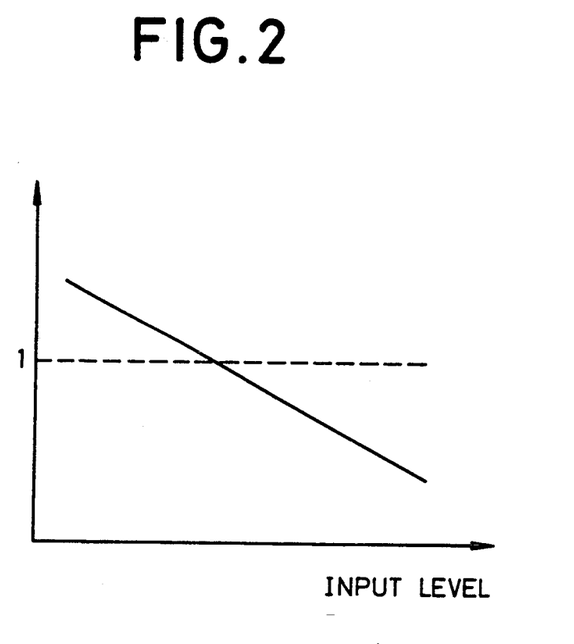
FIG. 2 is a graph showing the gain characteristic of a compressor.

A volume adjusting means 1 allows a listener to manually adjust a volume of an inputted music sound signal, and supplies a compressor 2 and an amplifier 3 with the adjusted music sound signal. The music sound signal then is amplified by the amplifier 3 and reproduced by a speaker 4. The speaker 4 is placed at an appropriate position in a vehicle cabin. The compressor 2 adds to the music sound signal a gain as indicated by a solid line in FIG. 2 to compress the level thereof, and supplies a low pass filter 5 with the compressed music sound signal. The level of the music sound signal is maintained by the compressor 2 at a level at which a human can feel pleasant low sounds. The low pass filter 5 only supplies low frequency band components to an amplifier 6. It is considered that the appropriate cut-off frequency of the low pass filter 5 is, for example, approximately 120 Hz, −12 dB/oct. The amplifier 6 amplifies the low frequency band component signal and supplies the amplified signal to a bodily-sensible sounds generation unit 8 built in a seat 7.

In the on-vehicle audio system reproducing bodily-sensible sounds, the passenger manipulates the volume adjusting means 1 to obtain reproduced sounds and bodily-sensible sounds at an arbitrary magnitude.

However, in a vehicle cabin susceptible to the influence of vibrations from the outside, since vibrations due to the running vehicle mask bodily-acoustic low sounds, a problem arises that the original bodily acoustic vibrations cannot be obtained. As a method of eliminating such masking, the level of the audio system reproducing bodily-sensible sounds is adjusted in accordance with such vibrations of the running vehicle, wherein the level of the audio system reproducing bodily-sensible sounds has been adjusted by a manual volume adjusting means. However, it is impossible to manually adjust the level in a timely manner, thus presenting a problem that a listener will have an inharmonious feeling when "listening" the bodily-sensible sounds.

OBJECTS AND SUMMARY OF THE INVENTION

The present invention has been made to solve the above-mentioned problems, and its object is to provide an on-vehicle audio system reproducing bodily-sensible sounds, which is capable of rapidly eliminating the masking of bodily-sensible sounds caused by vibrations of a running vehicle and generating bodily-sensible sounds without giving an inharmonious feeling to the listener.

The on-vehicle audio system reproducing bodily-sensible sounds according to the present invention having a low pass filter for extracting only low frequency band components of an inputted signal; an amplifying means for amplifying the output of the low pass filter and delivering the amplified signal; and a vibration unit disposed in a seat of a vehicle for converting the amplified signal to mechanical vibrations; comprises a vibration sensor for generating a vibration signal of a magnitude in accordance with vibrations of a vehicle body; and level adjusting means for adjusting the level of the inputted signal in accordance with an average level of the vibration signal.

DESCRIPTION OF THE PREFERRED EMBODIMENTS

Embodiments of the present invention will hereinafter be described with reference to the accompanying drawings.

Figure 3:
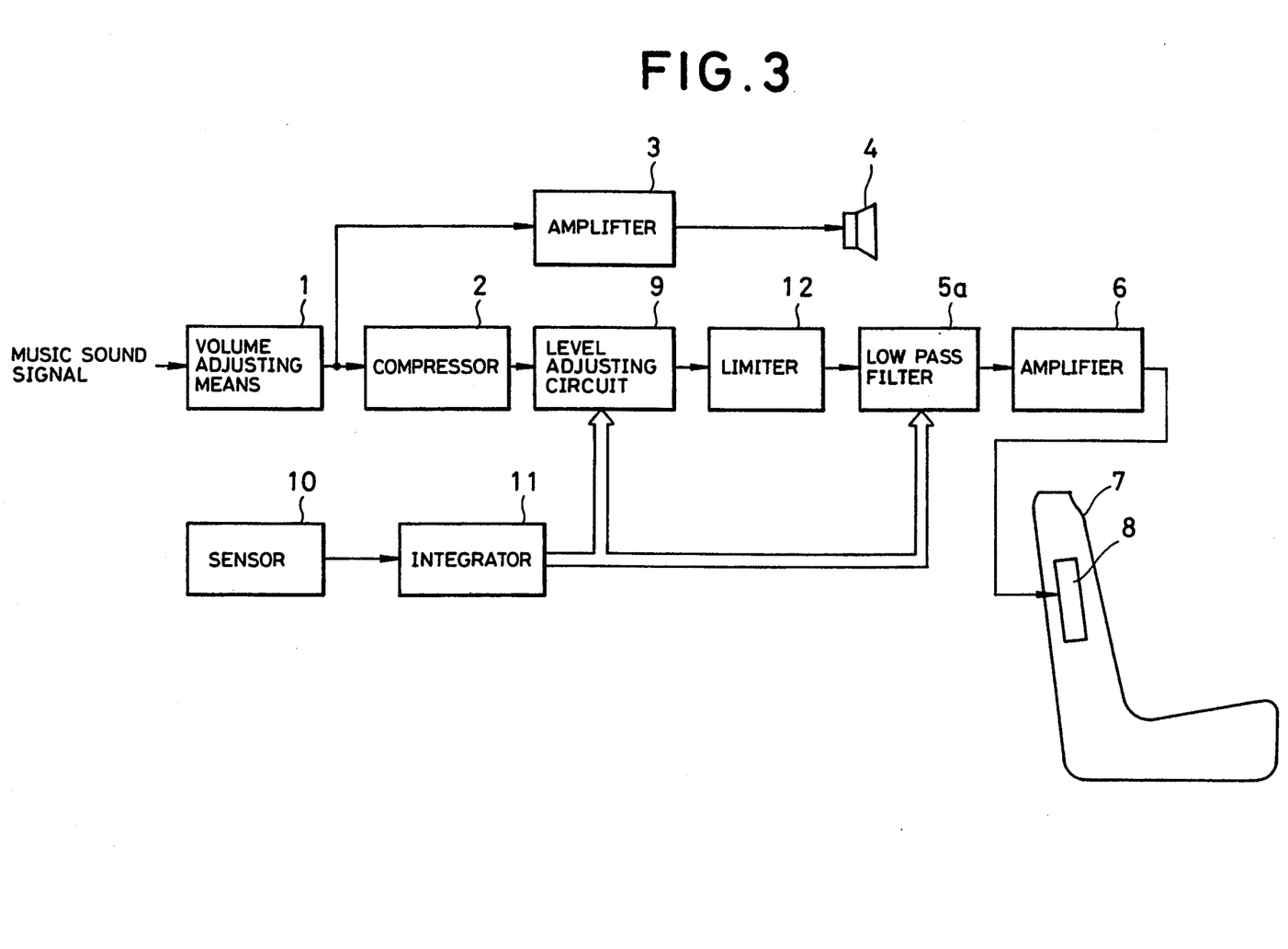
FIG. 3 is a block diagram showing the configuration of an on-vehicle audio system reproducing bodily-sensible sounds, according to one embodiment of the present invention.

FIG. 3 illustrates the configuration of an on-vehicle audio system reproducing bodily-sensible sounds according to the present invention.

A volume adjusting means 1 adjusts the volume of an inputted music sound signal and supplies a compressor 2 and an amplifier 3 with the adjusted music sound signal. An example of the volume adjusting means 1 is a variable resistor disposed to be operable by the user of the sound system. The music sound signal is amplified by the amplifier 3 and reproduced by a speaker 4. The speaker 4 is placed at an appropriate position in a vehicle cabin. The compressor 2 adds to the music sound signal a gain as indicated by a solid line in FIG. 2 to compress the level thereof, and supplies the compressed music sound signal to a level adjusting circuit 9. The level of the music sound signal is maintained by the compressor 2 at a level at which a human can feel pleasant low sounds. A sensor 10 is, for example, a vibration sensor directly coupled to a vehicle body and generates a vibration signal in accordance with the magnitude of vibrations of the vehicle which is supplied to an integrator circuit 11. The integrator circuit 11 supplies the level adjusting circuit 9 and a low pass filter 5a with, for example, an 8-bit control signal in accordance with an average value of the vibration signal. The level adjusting circuit 9 performs a level adjustment on the compressed music sound signal in response to the control signal, and supplies the compressed music sound signal with the adjusted level to a limiter 12. The limiter 12 limits the compressed music sound signal with the adjusted level so as to prevent the amplifier 6 from causing clip due to the compressed music sound signal, and supplies the limited music sound signal to the low pass filter 5a. The low pass filter 5a supplies the amplifier 6 only with a low frequency band component signal within the signal from the limiter 12 below the cut-off frequency thereof which is determined by the control signal. The amplifier 6 amplifies the supplied low frequency band component signal and supplies the amplified signal to a bodily-sensible sound generation unit 8 built in a seat 7.

It should be noted that since the magnitude of vibrations of the vehicle is substantially proportional to a running speed of the vehicle, the sensor 10 may be a speed sensor which generates a vehicle speed signal to be used in place of a vibration signal, as described later.

Next, the operation of the configuration as described above will be explained.

When the vehicle starts running and vibrations of the vehicle increases, the level of an output signal from the sensor 10 is increased accordingly. The integrator circuit 11 is responsive to this increase in the level of the output signal to decrease an attenuating amount of the level adjusting circuit 9 to perform a control so as to increase the level of the signal inputted to the low pass filter 5a. The integrator circuit 11 further controls to increase the cut-off frequency of the low pass filter 5a. Thus, the level of signal inputted to the amplifier 6 is increased to cause the bodily-sensible sound generation unit 8 to generate increased bodily acoustic audio vibration. In this manner, the level of bodily acoustic audio vibration is also increased automatically in accordance with the increase of the vibration level of the vehicle.

Figure 4:
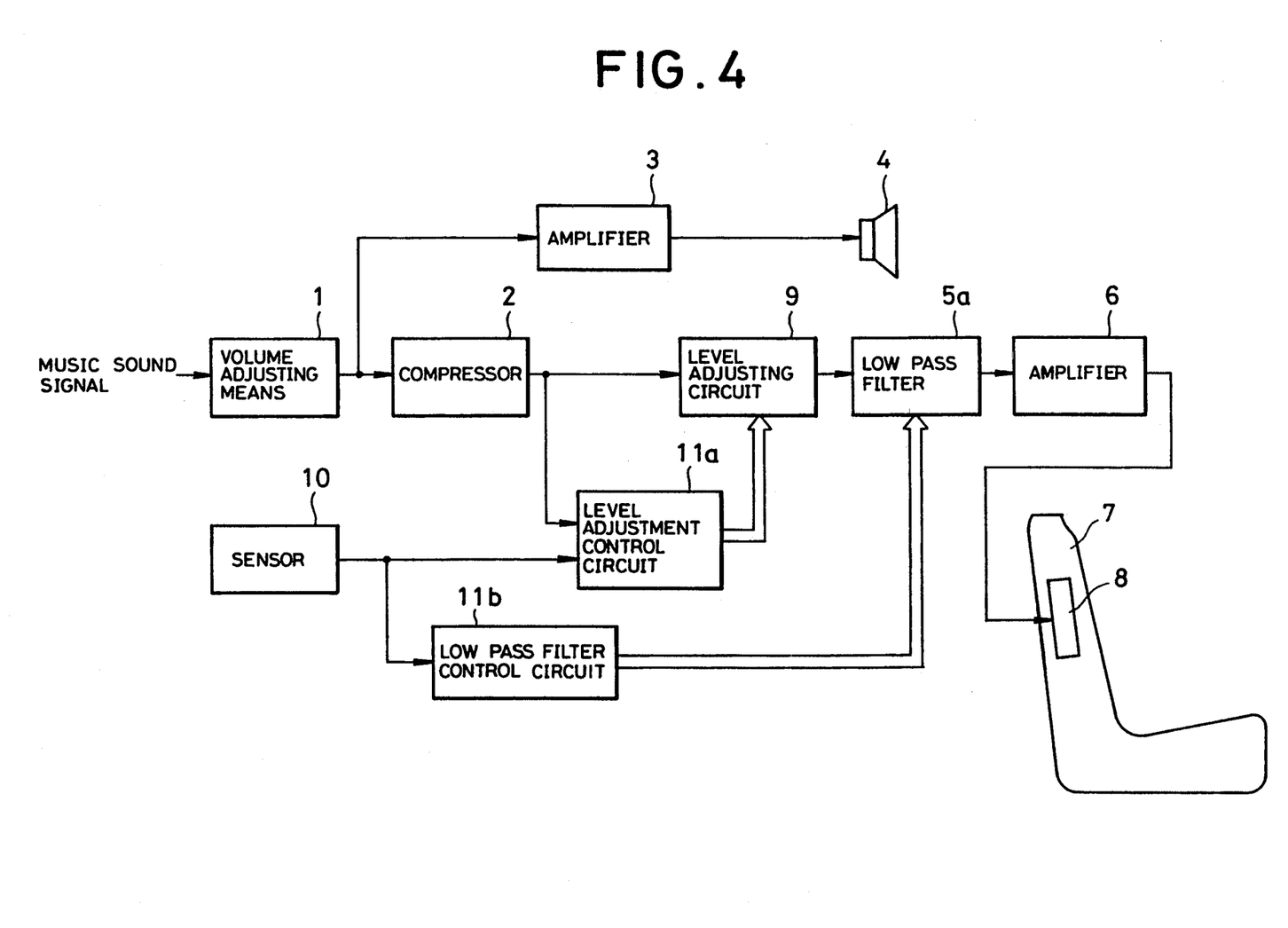
FIG. 4 is a block diagram showing the configuration of an on-vehicle audio system reproducing bodily-sensible sounds, according to another embodiment of the present invention.

FIG. 4 illustrates the configuration of an on-vehicle audio system reproducing bodily-sensible sounds according to another embodiment of the present invention. In FIG. 4, the same functional blocks are designated the same reference numerals as those in FIG. 3.

A compressed music sound signal from a compressor 2 is supplied to a level adjusting circuit 9 and a level adjustment control circuit 11a. A sensor 10 generates a vibration signal in accordance with the magnitude of vibrations of the vehicle and supplies the vibration signal to the level adjustment control circuit 11a and a low pass filter control circuit 11b. The level adjustment control circuit 11a calculates the difference between an average value of the vibration signal and an average value of the compressed music sound signal, and supplies the level adjusting circuit 9 with, for example, an 8-bit control signal represenative of the calculation result. The level adjusting circuit 9 performs a level adjustment on the inputted compressed music sound signal in accordance with the supplied control signal, and supplies a low pass filter 5a with the compressed music sound signal having the level adjusted. The low pass filter control circuit 11b performs a frequency analysis for the vibration signal, and supplies the low pass filter 5a with, for example, an 8-bit control signal for lowering the cut-off frequency of the low pass filter 5a when a lot of low frequency band components are included in the frequency band components of the vibration signal, while supplies the low pass filter 5a with a control signal for raising the cut-off frequency of the low pass filter 5a when a lot of high frequency band components are included. The low pass filter 5a supplies the amplifier 6 only with a low frequency band component signal within the signal from the level adjusting circuit 9 which is below the cut-off frequency determined by the control signal. The amplifier 6 amplifies the low frequency band component signal, and supplies the amplified signal to a bodily-acoustic audio unit 8 built in a seat 7.

Figure 5:
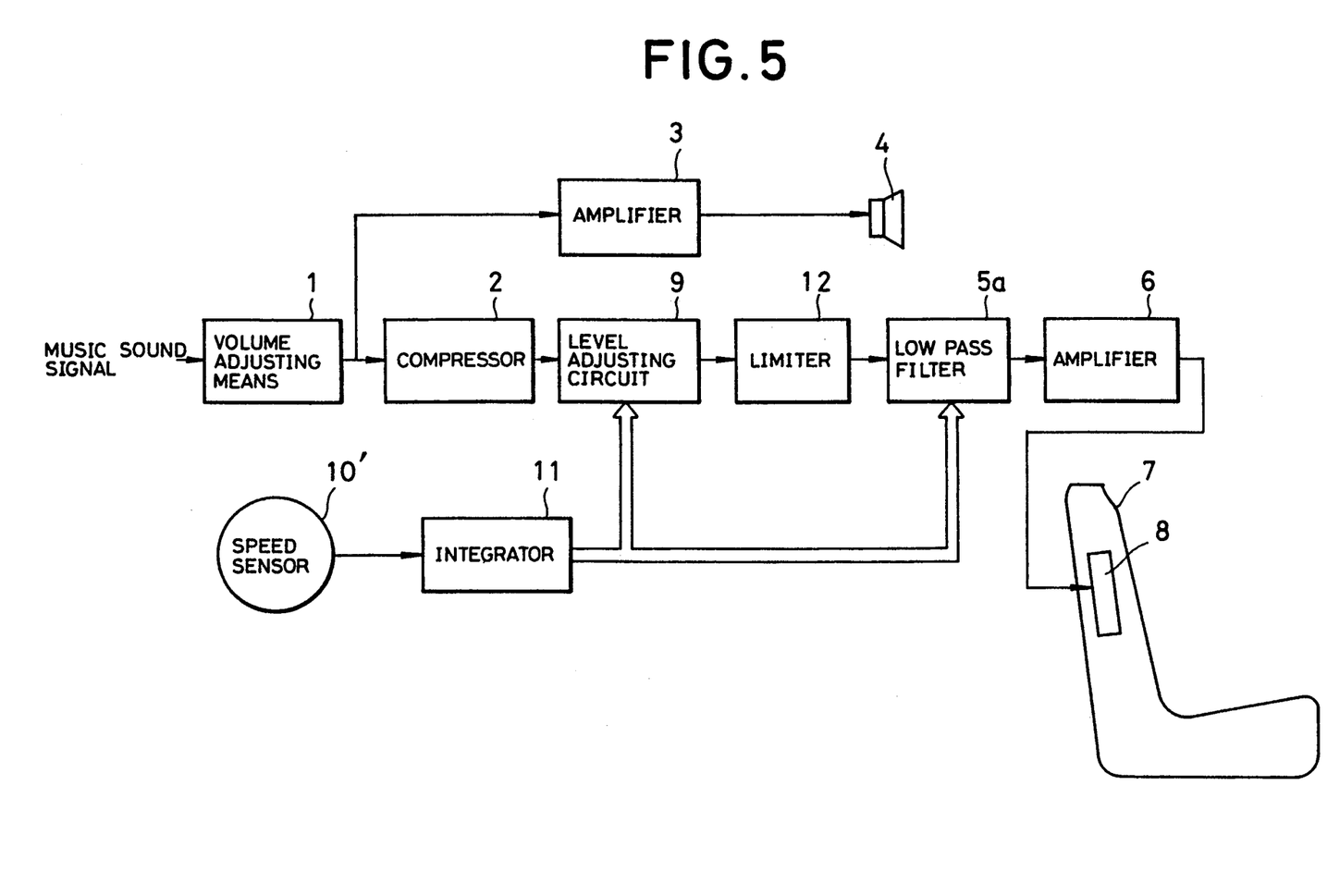
FIG. 5 is a block diagram showing the configuration of an on-vehicle audio system reproducing bodily-sensible sounds, according to a further embodiment of the present invention.
Figure 6:
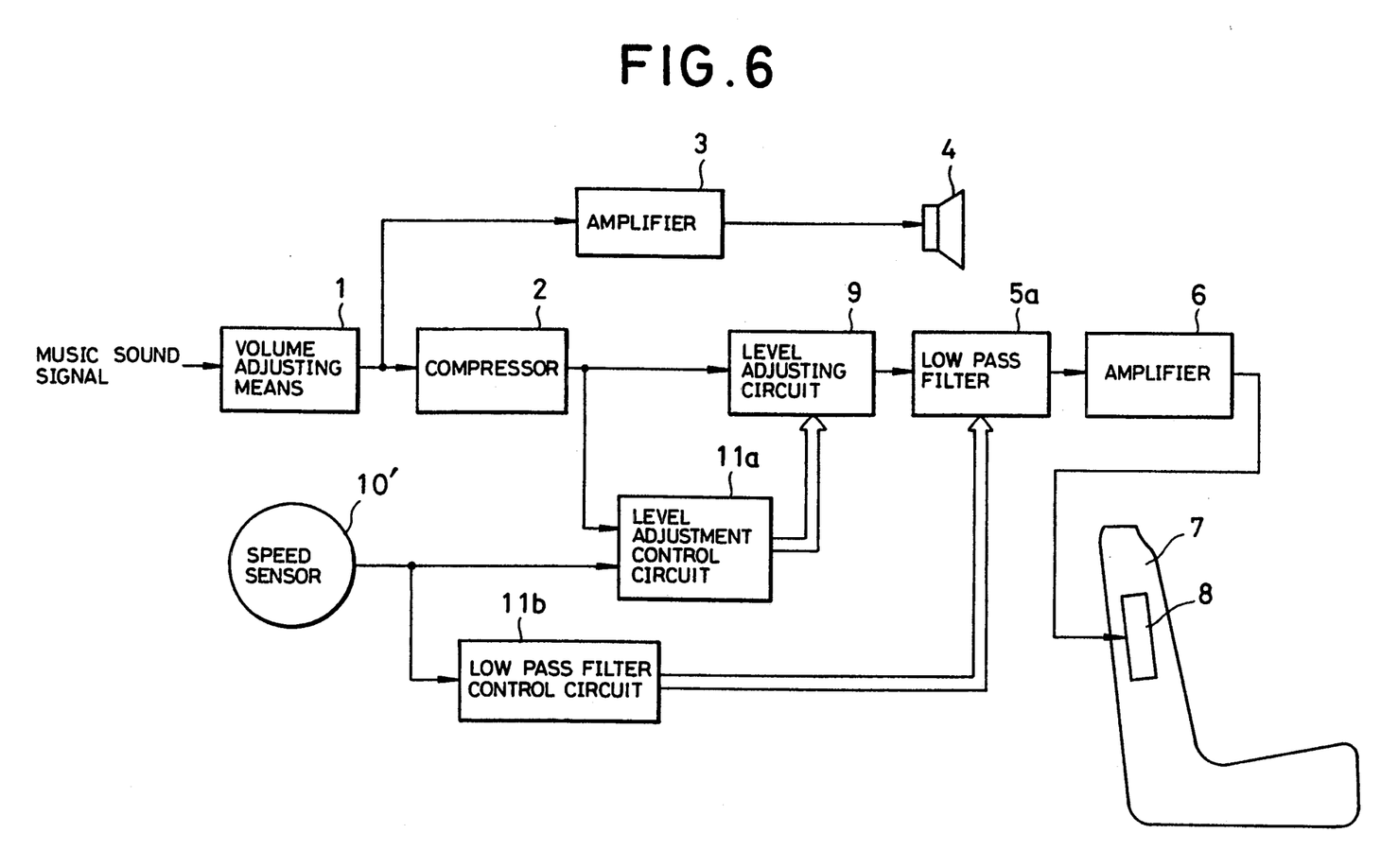
FIG. 6 is a block diagram showing the configuration of an on-vehicle audio system reproducing bodily-sensible sounds, according to a still further embodiment of the present invention.

FIGS. 5 and 6 show further embodiments in which the sensor 10 shown in FIGS. 3 and 4 is replaced by a speed sensor 10' producing a speed signal indicating the vehicle speed. Since the remaining portions of the system shown in each figure are identical with those shown in FIGS. 3 and 4, the explanation thereof will not be repeated.

It should be noted that the magnitude of vibrations of the vehicle is substantially proportional to a running speed of the vehicle, and the output signal of the speed sensor 10' is similarly used as the vibration signal produced by the sensor 10 used in the arrangement shown in FIGS. 3 and 4.

As has been described hitherto, the on-vehicle audio system reproducing bodily-sensible sounds according to the present invention employs the configuration of detecting vibrations while the vehicle is running and amplifying a low frequency band component signal from the low pass filter with a gain which varies in accordance with the detected vibration level, the level of a signal inputted to the vibration unit of the audio system reproducing bodily-sensible sounds is automatically adjusted in accordance with the magnitude of vibrations caused by the running vehicle. It is therefore possible to rapidly eliminate masking of bodily-sensible sounds due to the running vibration and generate bodily-sensible sounds without giving an inharmonious feeling to the listener.

What is claimed is:

1. An on-vehicle audio system reproducing bodily-sensible sounds, comprising:
   audio means, including at least one speaker for reproducing signals from said audio means;
   a compressor operatively connected to said audio means to receive an inputted signal from said audio means, for compressing an amplitude of said inputted signal and producing a compressed output signal;
   a low pass filter for extracting only low frequency band components of said compressed output signal;
   an amplifying means for amplifying the output of said low pass filter and delivering the amplified signal;
   a vibration unit disposed in a seat of a vehicle for converting said amplified signal to mechanical vibrations;
   a vibration sensor for generating a vibration signal of a magnitude in accordance with vibrations of a vehicle body; and
   level adjusting means for adjusting the level of said compressed output signal in accordance with an average level of said vibration signal.

2. An on-vehicle audio system reproducing bodily-sensible sounds, as claimed in claim 1, further comprising low pass filter adjusting means for adjusting the cut-off frequency of said low pass filter in accordance with the average level of said vibration signal.

3. An on-vehicle audio system reproducing bodily-sensible sounds according to claim 1, wherein said level adjusting means adjusts the level of said compressed output signal in accordance with the difference in average level between said vibration signal and said input signal.

4. An on-vehicle audio system reproducing bodily-sensible sounds according to claim 2, wherein said level adjusting means adjusts the level of said input signal in accordance with the difference in average level between said vibration signal and said compressed output signal.

5. An on-vehicle audio system reproducing bodily-sensible sounds, comprising:
   audio means, including at least one speaker, for reproducing signals from said audio means;
   a compressor operatively connected to said audio means to receive an inputted signal from said audio means, for compressing an amplitude of said inputted signal and producing a compressed output signal;
   a low pass filter for extracting only low frequency band components of said compressed output signal;
   an amplifying means for amplifying the output of said low pass filter and delivering the amplified signal;
   a vibration unit disposed in a seat of a vehicle for converting said amplified signal to mechanical vibrations;
   a speed sensor for generating a speed signal corresponding to the magnitude of vibrations in accordance with a vehicle speed; and
   level adjusting means for adjusting the level of said compressed output signal in accordance with an average level of said speed signal.

6. An on-vehicle audio system reproducing bodily-sensible sounds, as claimed in claim 5, further comprising low pass filter adjusting means for adjusting the cut-off frequency of said low pass filter in accordance with the average level of said speed signal.

* * * * *

UNITED STATES PATENT AND TRADEMARK OFFICE
CERTIFICATE OF CORRECTION

PATENT NO. : 5,355,419
DATED : October 11, 1994
INVENTOR(S) : Yamamoto et al.

It is certified that error appears in the above-identified patent and that said Letters Patent is hereby corrected as shown below:

In claim 4, col. 5, line 12 delete "compressed output" and insert --input--.

Signed and Sealed this

Twenty-eight Day of February, 1995

Attest:

BRUCE LEHMAN

Attesting Officer

Commissioner of Patents and Trademarks